US012641071B2

(12) United States Patent
Hicks et al.

(10) Patent No.: US 12,641,071 B2
(45) Date of Patent: May 26, 2026

(54) DETOKENIZATION OF AN ELECTRONIC REQUEST INITIATED USING A MOBILE APPLICATION

(71) Applicant: Truist Bank, Charlotte, NC (US)

(72) Inventors: Michael Hicks, Fuquay-Varina, NC (US); Bruce Richards, Climax, GA (US)

(73) Assignee: Truist Bank, Charlotte, NC (US)

( * ) Notice: Subject to any disclaimer, the term of this patent is extended or adjusted under 35 U.S.C. 154(b) by 227 days.

(21) Appl. No.: 18/641,546

(22) Filed: Apr. 22, 2024

(65) Prior Publication Data

US 2025/0328611 A1      Oct. 23, 2025

Related U.S. Application Data

(63) Continuation of application No. 18/640,309, filed on Apr. 19, 2024.

(51) Int. Cl.
H04L 9/40          (2022.01)
G06F 21/31          (2013.01)

(52) U.S. Cl.
CPC .......... H04L 63/0807 (2013.01); G06F 21/31 (2013.01)

(58) Field of Classification Search
CPC ............................ H04L 63/0807; G06F 21/31
See application file for complete search history.

(56) References Cited

U.S. PATENT DOCUMENTS

| | | | | |
|---|---|---|---|---|
| 2024/0348609 A1* | 10/2024 | Sharma | .............. | H04L 61/5007 |
| 2024/0388900 A1* | 11/2024 | Cho | ........................ | G06F 9/547 |
| 2025/0373423 A1* | 12/2025 | Meves | ................... | H04L 9/088 |

* cited by examiner

*Primary Examiner* — Clayton R Williams
(74) *Attorney, Agent, or Firm* — Kilpatrick Townsend & Stockton LLP; Michael A. Springs, Esq.

(57) ABSTRACT
A system includes a processing device and a memory device that includes instructions executable by the processing device for causing the processing device to perform operations. The system can receive an inquiry request generated by a software application in response to receiving a validation request to validate an identity of an entity initiating the validation request. Based on the inquiry request, the system can match an entity identifier to the token to validate the identity of the entity. Subsequently, the system can generate a validation indication to transmit to the software application. The validation indication can include the entity identifier associated with the token and the entity. The system can transmit the validation indication to the software application. The software application can receive an interaction request including the token and replace the token of the interaction request with the entity identifier provided in the validation indication.

20 Claims, 3 Drawing Sheets

300

302
Receive a validation request from a request initiator to validate an identity of an entity initiating the validation request by inputting authentication information 304
Validate the identity of the entity using a detokenization service based on the validation request 306
In response to validating the identity of the entity, receive an interaction request created by the request initiator in response to the entity selecting a particular request option of one or more request options generated by the request initiator 308
Replace the token of the interaction request with the entity identifier prior to processing the interaction request

*FIG. 3*

DETOKENIZATION OF AN ELECTRONIC REQUEST INITIATED USING A MOBILE APPLICATION

CROSS-REFERENCE TO RELATED APPLICATION

This application is a continuation of U.S. patent application Ser. No. 18/640,309 filed Apr. 19, 2024, entitled "Detokenization of an Electronic Request Initiated Using a Mobile Application," the entirety of which is incorporated herein by reference.

TECHNICAL FIELD

The present disclosure relates generally to data security and, more particularly (although not necessarily exclusively), to detokenization of an electronic request initiated using a mobile application.

BACKGROUND

An electronic request can be made between persons, between entities, or between a combination thereof. An electronic request can include one or more communications (e.g., messages) that can provide various information about the electronic request, for example sender and receiver identifying information, account information, etc. The electronic request can undergo tokenization to substitute a sensitive data element of the electronic request with a non-sensitive equivalent that can be referred to as a token. Detokenization can involve a process of returning the token of the electronic request back into the original sensitive data element.

BRIEF DESCRIPTION OF THE DRAWINGS

FIG. 3 is a flowchart of a process for detokenizing an electronic request initiated using a mobile application, according to one example of the present disclosure.

DETAILED DESCRIPTION

Figure 1:
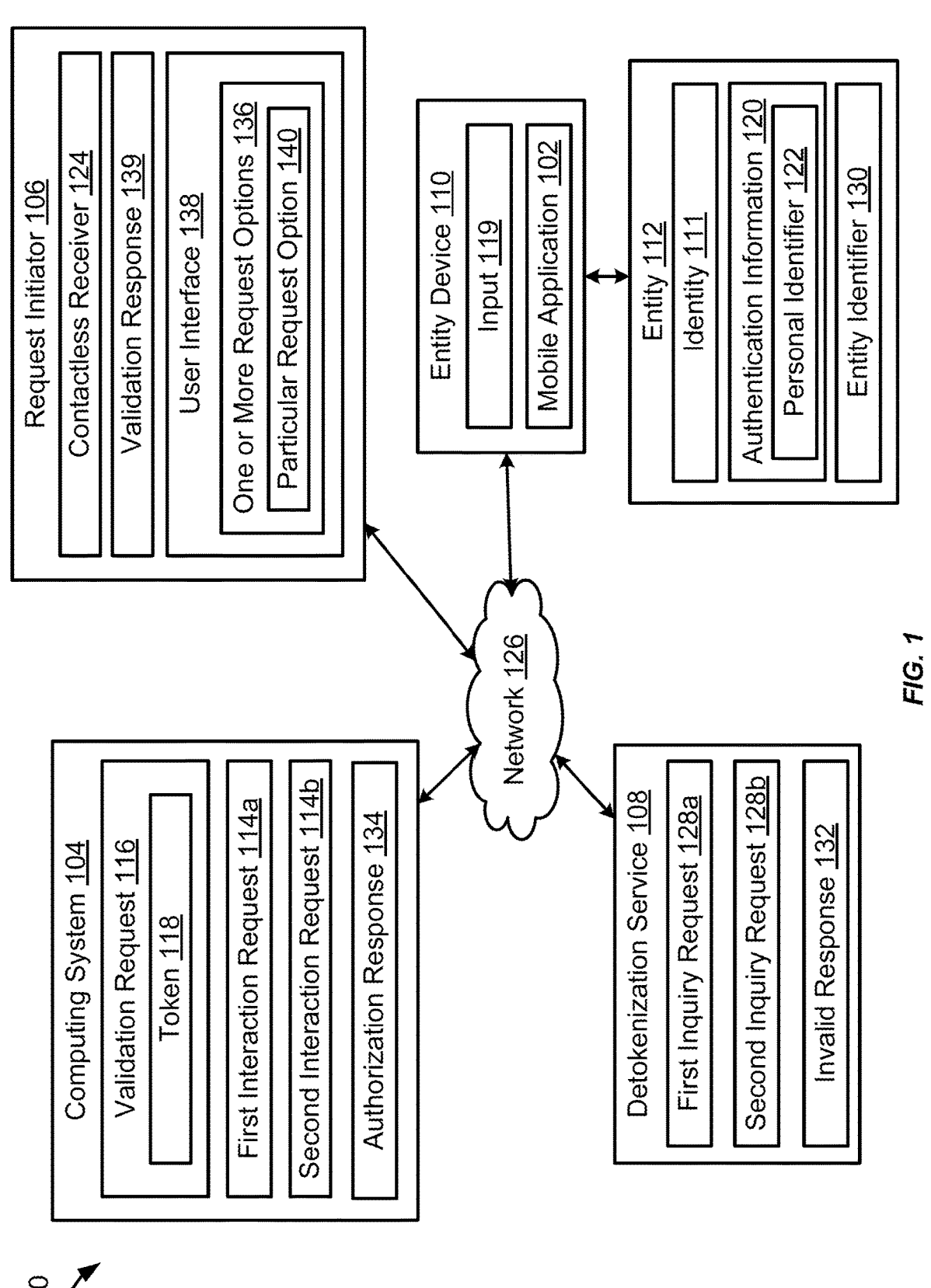
FIG. 1 is a block diagram of an example of a processing network that can be used to detokenize an electronic request initiated using a mobile application, according to one example of the present disclosure.

Certain aspects and examples of the present disclosure relate to a system and method for detokenization of an electronic request initiated by a mobile application. An entity may use an entity device including the mobile application to interact with a request initiator to initiate a validation request as the electronic request to authenticate an identity of the entity. To ensure data privacy or information security, an entity identifier associated with the entity may be replaced in the validation request with a token that can be used to determine the entity identifier through a detokenization process. A computing system can receive the validation request from the request initiator and communicate with a detokenization service to authenticate the identity of the entity and perform the detokenization process with respect to the validation request. But, using a detokenization interface to communicatively couple the computing system with the detokenization service can be time-consuming and costly in terms of computing resources and man-hours. Because of the complicated nature of building and accessing a dedicated detokenization interface to interact with the detokenization service, implementing a detokenization process that leverages network routing rules to perform the detokenization process may be beneficial.

In some examples, the detokenization process may be implemented using one or more messages (e.g., requests or indications) used to communicate between the computing system and the detokenization service. The messages can conform to the network routing rules such that the detokenization interface is unnecessary to perform the detokenization process, conserving computing resources and costs. For example, the computing system can generate an inquiry request using the token and authentication information associated with the entity to validate an identity of the entity. After validating the identity of the entity based on the inquiry request, the detokenization service can transmit a validation indication including the entity identifier to the computing system. Based on a successful validation of the identity, the computing system can communicate with the request initiator to allow the entity to initiate an interaction request via the request initiator. Once the request initiator receives input from the entity, the request initiator can generate the interaction request including the token to perform a particular interaction with respect to a particular account associated with the entity. Using the entity identifier included in the validation indication, the computing system can replace the token of an interaction request with the entity identifier such that the interaction request can be processed.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a processing network 100 that can be used to detokenize an electronic request initiated using a mobile application 102, according to one example of the present disclosure. In an example, the processing network 100 can include a computing system 104, a request initiator 106, a detokenization service 108, and an entity device 110 associated with an entity 112. The computing system 104 and the request initiator 106 may, in some examples, be associated with an automated teller machine (ATM), and the detokenization service 108 may be a service provided by an external or third-party entity (e.g., Visa Debit Processing Service (DPS)). In examples in which the computing system 104 and the request initiator are associated with an ATM, the computing system 104 may correspond to an ATM software application used to perform one or more operations of the ATM. The request initiator 106 can correspond to hardware of the ATM. Examples of the entity device 110 can include a laptop computer, smartphone, tablet computer, or smartwatch.

The processing network 100, in some examples, may facilitate a fulfillment of interaction requests 114, such as a withdrawal from a bank. Before generating an interaction request 114, the request initiator 106 may generate a validation request 116 to validate an identity 111 of the entity 112. To protect sensitive data associated with the entity 112, the validation request 116 may include a token 118 provided by the entity device 110 that can replace the sensitive data of the validation request 116. In implementations of banking systems, the token 118 can be a sequence of characters that replaces a primary account number (PAN) associated with an entity card (e.g., a credit card, debit card, ATM card, stored value card, etc.) of the entity 112. The entity device 110 can store the token 118 to use in lieu of the entity card, for example at an ATM.

The entity 112 can initiate the validation request 116 by using the entity device 110 to transmit input 119 to the request initiator 106 via a wireless connection. In an example, the entity 112 may use the entity device 110 to input authentication information 120 (e.g., a personal identifier 122) at the request initiator 106. The authentication information 120 can be used to validate or verify the identity 111 of the entity 112. Examples of the personal identifier 122 can include a personal identification number (PIN), username, password, biometric data, or other suitable authentication factors. The request initiator 106 can include a I/O device used by the entity 112 to provide the authentication information 120 to the request initiator 106.

Additionally or alternatively, the entity 112 may initiate the validation request 116 using a mobile application 102 installed on the entity device 110. The request initiator 106 may include a contactless receiver 124 that can establish a connection with the entity device 110 once the entity device 110 is positioned within a predefined range or distance. The request initiator 106 can use the input 119 transmitted by the entity device 110 to the contactless receiver 124 to generate the validation request 116. In an example, the contactless receiver 124 may provide a level surface with the predefined range such that the entity device 110 can be positioned adjacent to the level surface to initiate the validation request 116. In some implementations, the entity device 110 can communicate with the contactless receiver 124 using short-range wireless communication, such as near-field communication. Additionally or alternatively, the computing system 104 may use a user interface to provide a machine-readable optical image (e.g., a quick response (QR) code) that the entity device 110 can use to establish a wireless connection with the computing system 104. In some examples, the computing system 104 can correspond to a banking system functioning as both an acquirer and an issuer.

To enable the processing network 100 to fulfill an interaction request 114, the computing system 104 may interact with a detokenization service 108 to detokenize the token 118 of the validation request 116. In some examples, the detokenization service 108 can verify an identity 111 of the entity 112 prior to detokenizing the token 118. Due to the resource consumption of using a dedicated detokenization interface to interact with the detokenization service 108, the computing system 104 instead may employ one or more communication protocols to perform the detokenization process. In an example, the communication protocols can include network routing rules. Communication between the computing system 104 and the detokenization service 108 may be by way of a network 126, such as a local area network (LAN), wide area network (WAN), the Internet, or any combination thereof.

Once the entity 112 uses the entity device 110 to initiate the validation request 116 to verify the identity 111 of the entity 112, the computing system 104 can transmit an inquiry request 128 to the detokenization service 108. For example, the inquiry request 128 may be a balance inquiry request. The computing system 104 can generate and transmit the inquiry request 128 in accordance with the network routing rules associated with the detokenization service 108. The inquiry request 128 can include the token 118 used by the detokenization service 108 to identify the entity 112 associated with the inquiry request 128. Specifically, the detokenization service 108 can use the token 118 to locate an entity identifier 130 associated with the entity 112. In some examples, the entity identifier can be stored in a token database, such as a token vault, that maps one or more tokens 118 to the entity 112 associated with the entity identifier 130. Once the detokenization service 108 identifies the entity identifier 130 linked to the token 118, the detokenization service 108 can generate a validation indication 131 based on the inquiry request 128. Generating the validation indication 131 may involve repackaging the inquiry request 128 by rearranging or replacing components of the inquiry request 128. For example, in the validation indication 131, the token 118 of the inquiry request 128 can be replaced with the entity identifier 130, thereby detokenizing the token 118 of the inquiry request 128.

Additionally, the inquiry request 128 may include the authentication information 120 inputted by the entity 112 into the request initiator 106. Using the authentication information 120, the detokenization service 108 can validate the identity 111 of the entity 112 to ensure data privacy and security. In some examples, once the detokenization service 108 validates the identity 111 of the entity 112, the detokenization service 108 can generate and transmit the validation indication 131 including the entity identifier 130 to the computing system 104. In an example, the entity 112 may use a keypad of the request initiator 106 as an input device to input a personal identification number (PIN) as the personal identifier 122 to validate the identity 111 of the entity 112. The personal identifier 122 can be transmitted to the detokenization service 108 as part of the authentication information 120 of the inquiry request 128. Additionally or alternatively, multi-factor authentication can be used to validate the identity 111 of the entity 112 such that more than one personal identifier 122 is provided by the entity 112 to ensure data privacy and security.

If the detokenization service 108 is unable to validate the identity 111 of the entity 112 using the personal identifier 122, the computing system 104 may receive an invalid response 132 from the detokenization service 108. Accordingly, the invalid response 132 can indicate that the identity 111 of the entity 112 is unverified. In some examples, if the computing system 104 receives the invalid response 132, the computing system 104 may communicate with the request initiator 106 prompt the entity 112 to input the personal identifier 122 again. Additionally or alternatively, the request initiator 106 may prompt the entity 112 to use another personal identifier to validate the identity 111 of the entity 112. Alternatively, once the computing system 104 receives the invalid response 132, the computing system 104 may prevent the validation request 116 from being completed. With an incomplete validation request, the entity 112 may be unable to initiate an interaction request 114 using the request initiator 106.

In some examples, more than one validation request 116 may be initiated by one or more entities 112 with respect to the request initiator 106. For example, the entity 112 can be a first entity with a first identity that is verified using a first validation request. A second entity different from the entity 112 may initiate a second validation request to validate a second identity of the different entity. The second entity may initiate the second validation request after the detokenization service 108 validates the identity 111 of the entity 112 based on the validation request 116. The computing system 104 can forward the second validation request to the detokenization service 108 to perform a validation process with respect to the second identity of the second entity. In some examples, in response to forwarding the second validation request to the detokenization service 108, the computing system 104 may receive an invalid response 132 from the detokenization service 108. The invalid response 132 can indicate that the second identity of the second entity is unverified based on the second validation request.

In examples in which the detokenization service 108 validates the identity 111 of the entity 112, the computing system 104 may receive a validation response 134 from the detokenization service 108. The validation response 134 can also be referred to as an authorization response. Additionally or alternatively, the computing system 104 can receive the validation indication 131 from the detokenization service 108. In an example, the validation indication 131 can be an issuer balance inquiry request. Contents of the inquiry request 128 can be repackaged to generate the validation indication 131. Specifically, the validation indication 131 can include the entity identifier 130 in place of the token 118 of the inquiry request 128. Once the computing system 104 receives the validation indication 131, the computing system 104 can store the entity identifier 130 included in the validation indication 131 for future electronic requests associated with the entity 112. Additionally, after the computing system 104 receives the validation indication 131, the computing system 104 may generate and transmit a response message to the detokenization service 108, indicating a fulfillment of the validation request 116.

Once the computing system 104 receives the validation response 134, the computing system 104 can communicate with the request initiator 106 to output a user interface 138 including one or more request options 136. The entity 112 can select a particular request option 140 of the request options 136 to initiate an interaction request 114. In one example, if the request initiator 106 is an ATM, the ATM can output one or more request options 136 pertaining to an entity account, such as initiating a withdrawal, initiating a deposit, or checking a repository of the entity account. The request initiator 106 may output additional options after the entity 112 selects the particular request option 140, for example to have the entity 112 specify an amount of resources to transfer.

Once the entity 112 selects the particular request option 140, the request initiator 106 can generate an interaction request 114 corresponding to the particular request option 140. In an example, the entity 112 can select to transfer a particular amount of resources as the particular request option 140. Accordingly, the request initiator 106 then can generate an interaction request 114 to transfer the particular amount of resources from one account associated with the entity 112 to another account. In some examples, once generated by the computing system 104, the interaction request 114 may include the token 118 to represent or substitute an entity identifier 130 of the entity 112. Once the computing system receives the interaction request 114 from the request initiator 106, the computing system 104 can identify the token 118 of the interaction request 114 and replace the token 118 with the entity identifier 130 of the validation indication 131. Once the token 118 of the interaction request 114 is replaced with the entity identifier 130, the interaction request 114 can be processed to perform an interaction indicated by the interaction request 114. Examples of the interaction can include checking an amount of resources stored in an account repository, withdrawing the resources from a particular account of the entity 112, transferring the resources between accounts, or depositing the resources to the particular account.

In some examples, after determining the entity identifier 130 linked to the token 118 to process a first interaction request 114a, the computing system 104 may receive a second interaction request 114b initiated by the entity 112. For example, after the request initiator 106 generates the first interaction request 114a, the request initiator 106 may prompt the entity 112 to continue or finish interacting with the request initiator 106. If the entity 112 indicates to continue interacting with the request initiator 106, the entity 112 then may select another particular request option of the request options 136, for example provided via the user interface 138. Alternatively, if the entity 112 indicates to finish interacting with the request initiator 106, the request initiator 106 may perform a termination process and prepare to interact with a different entity. For example, the termination process may involve printing a receipt that provides a summary of the interaction request 114.

Selecting the other particular request option can cause the request initiator 106 to generate the second interaction request 114b. In an example, the entity 112 may select to check an account repository as the second interaction request 114b after making a withdrawal. In some examples, the second interaction request 114b may include another token that may be different from or similar to the token 118 of the first interaction request 114a. Both the token 118 and the other token can be associated with the entity 112. In some examples, instead of determining the entity identifier 130 with respect to the second interaction request 114b, the computing system 104 can use the stored entity identifier 130 to replace the different token.

Figure 2:
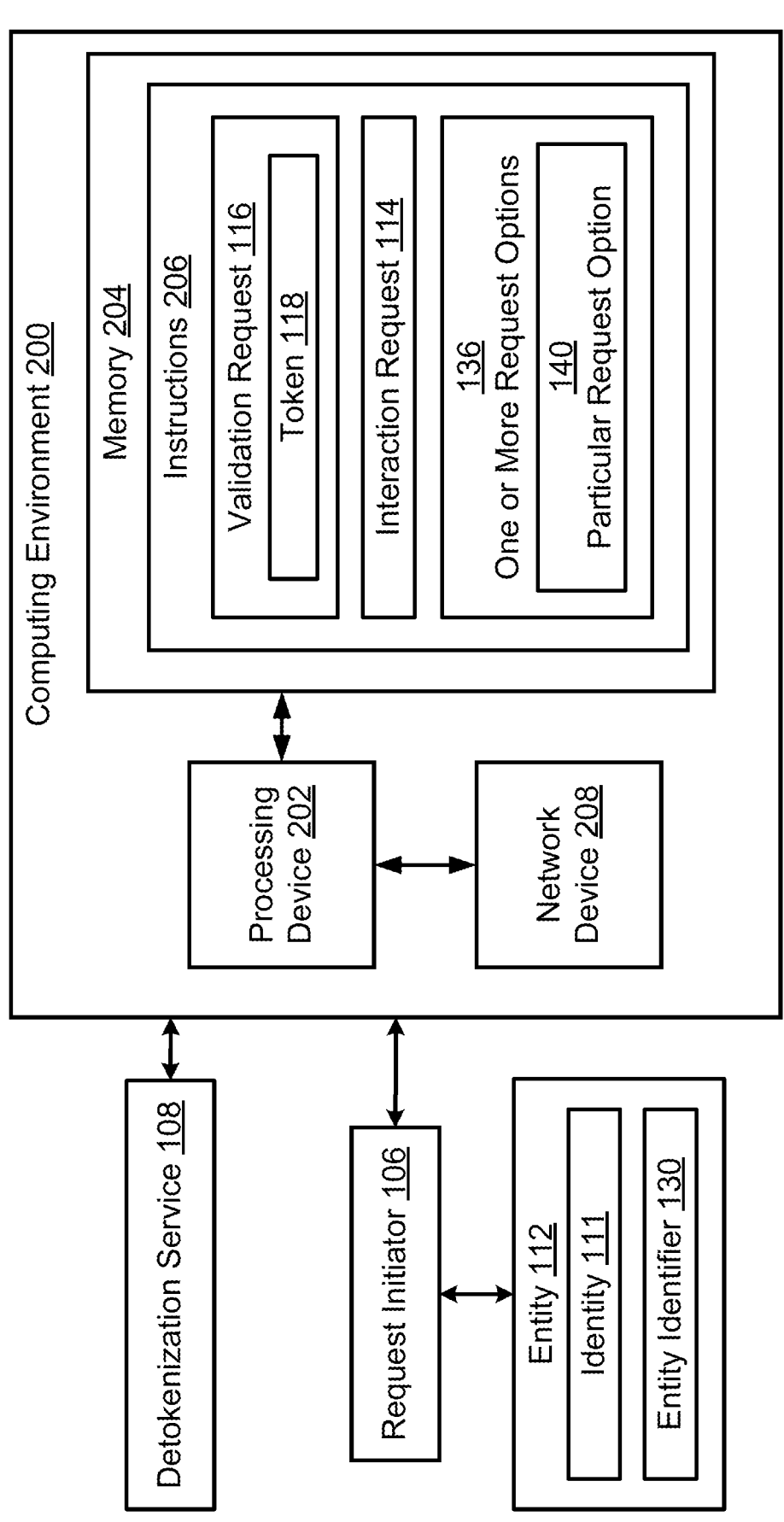
FIG. 2 is a block diagram of an example of a computing environment used to facilitate detokenization of an electronic request initiated using a mobile application, according to one example of the present disclosure.

FIG. 2 is a block diagram of an example of a computing environment 200 used to facilitate detokenization of an electronic request initiated using a mobile application, according to one example of the present disclosure. The computing environment 200 includes a processing device 202 that is communicatively coupled to a memory device 204. In some examples, the processing device 202 and the memory device 204 can be part of the same computing device, such as the computing environment 200. In other examples, the processing device 202 and the memory device 204 can be distributed from (e.g., remote to) one another. For instance, the memory device 204 may be hosted by a cloud storage provider.

The processing device 202 can include one processor or multiple processors. Non-limiting examples of the processing device 202 include a Field-Programmable Gate Array (FPGA), an application-specific integrated circuit (ASIC), or a microprocessor. The processing device 202 can execute instructions 206 stored in the memory device 204 to perform operations. The instructions 206 may include processor-specific instructions generated by a compiler or an interpreter from code written in any suitable computer-programming language, such as C, C++, C#, Java, or Python.

The memory device 204 can include one memory or multiple memories. The memory device 204 can be volatile or non-volatile. Non-volatile memory includes any type of memory that retains stored information when powered off. Examples of the memory device 204 include electrically erasable and programmable read-only memory or flash memory. At least some of the memory device 204 can include a non-transitory computer-readable medium from which the processing device 202 can read instructions 206. A non-transitory computer-readable medium can include electronic, optical, magnetic, or other storage devices capable of providing the processing device 202 with computer-readable instructions or other program code. Examples of a non-transitory computer-readable medium can include a magnetic disk, a memory chip, ROM, random-access memory (RAM), an ASIC, a configured processor, and optical storage.

The processing device 202 may also be communicatively coupled to a request initiator 106 including an I/O device for displaying, for example, a user interface that may be operated to configure the computing environment 200. The I/O device may also include any suitable device for configuring the computing environment 200, for instance, a keyboard, number pad, touchscreen, or mouse. The processing device 202 may also be communicatively coupled to a network device 208 for communicating with and among other devices in the computing environment 200 over a network (e.g., the network 126 of FIG. 1). In some examples, the network device 208 is a network interface card. In other examples, the network device 208 may be a virtual network interface implemented in software. The network may include all or part of multiple networks, including the Internet, a LAN, a WAN, wireless network, cellular network, or the like.

The processing device 202 can execute the instructions 206 to perform operations. The instructions 206 may include program code to detokenize a token 118 of a validation request 116 in accordance with network routing rules. In some examples, components of the computing environment 200 can be part of the computing system 104. For example, in accordance with the example from FIG. 1, the processing device 202 can receive a validation request 116 from a request initiator 106 to validate an identity 111 of an entity 112 initiating the validation request 116. In some examples, the validation request 116 can be initiated by the entity 112 inputting authentication information 120, for example via an I/O device of the request initiator 106. Additionally or alternatively, the validation request 116 may be initiated by the entity 112 using an entity device 110, such as a mobile device. In some examples, a mobile application 102 of the entity device 110 can be used to interact with the request initiator 106 to initiate the validation request 116.

As an illustrative example, a mobile application installed on a smartphone can be used to initiate a validation request 116 at a cardless or contactless ATM. Instead of using a physical card (e.g., a debit card or credit card), the entity 112 can use the mobile application to initiate the validation request 116 by positioning the smartphone within a predefined range of a contactless receiver 124 of the request initiator 106. A card identifier or security information of the physical card stored by the mobile application can be used to initiate the validation request 116 once the smartphone is positioned within the predefined range. Before enabling the entity 112 to proceed with an interaction request 114, the request initiator 106 may transmit a validation request 116 to the processing device 202 to verify an identity 111 of the entity 112 associated with the entity device 110. The validation request 116 can be generated using a token 118 to replace sensitive data (e.g., a card number or expiration date) of the physical card.

By communicating with a detokenization service 108 via the network device 208, the processing device 202 can validate the identity 111 of the entity 112 based on the validation request 116. Additionally, an entity identifier 130 mapped to the token 118 of the validation request 116 can be determined using the detokenization service 108. For example, the processing device 202 may transmit a message to the detokenization service 108 that includes the token 118 and authentication information (e.g., the authentication information 120 of FIG. 1) associated with the entity 112. The authentication information can be used by the detokenization service 108 to validate the identity 111 of the entity 112 prior to detokenizing the token 118 to determine the entity identifier 130. Subsequently, the processing device 202 can receive a response from the detokenization service 108 that includes the entity identifier 130. In some examples, the response may indicate that the identity 111 of the entity 112 has been verified by the detokenization service 108.

Once the processing device 202 receives the entity identifier 130 from the detokenization service 108, the processing device 202 may communicate with the request initiator 106 to provide one or more request options 136 to the entity 112. For example, the request options 136 may be provided to the entity 112 via a user interface 138 of the request initiator 106. A particular request option 140 of the request options 136 then can be selected by the entity 112. Once the entity 112 selects the particular request option 140, an interaction request 114 including the token 118 can be created by the request initiator 106 based on the particular request option 140. After receiving the interaction request 114 from the request initiator 106, the processing device 202 can replace the token 118 of the interaction request 114 with the entity identifier 130 such that the interaction request 114 can be processed.

FIG. 3 is a flowchart of a process 300 for detokenizing an electronic request (e.g., a validation request 116) initiated using a mobile application, according to one example of the present disclosure. In some examples, the processing device 202 can implement some or all of the blocks shown in FIG. 3. Other examples can include more blocks, fewer blocks, different blocks, or a different order of the blocks than is shown in FIG. 3. The blocks of FIG. 3 are discussed below with reference to the components discussed above in relation to FIGS. 1-2.

At block 302, the processing device 202 receives a validation request 116 from a request initiator 106 to validate an identity 111 of an entity 112 initiating the validation request 116 by inputting authentication information 120. In an example, the authentication information 120 can be inputted by the entity 112 using an I/O device of the request initiator 106 communicatively coupled to the processing device 202. The validation request 116 can include a token 118 used to identify the entity 112 associated with the validation request 116. The token 118 can function as a surrogate value with little to no intrinsic or exploitable value, increasing data security with respect to the entity 112 and the validation request 116. In some examples, the validation request 116 can be initiated by the entity 112 using an entity device 110 (e.g., laptop, smartphone, tablet, etc.).

As an illustrative example, the processing device 202 can be communicatively coupled with an ATM functioning as the request initiator 106. A mobile device can be used by the entity 112 as the entity device 110 to initiate a validation request 116 including the token 118 at the ATM. A mobile application of the mobile device can be used to store a digitized version of an entity card (e.g., a credit card, debit card, ATM card, etc.) using the token 118 to replace sensitive data (e.g., a card security code, expiration date, etc.) of the entity card. The validation request 116 can be generated by the ATM to validate the identity 111 of the entity 112 prior to enabling the entity 112 to initiate an interaction request 114 to perform an interaction via the ATM. Examples of the interaction can include withdrawing resources, depositing the resources, or checking an amount of the resources available in an account repository. The resources can include computing resources (e.g., storage, RAM, etc.) or monetary resources.

At block 304, the processing device 202 validates the identity 111 of the entity 112 using a detokenization service 108 based on the validation request 116. In addition to validating the identity 111 of the entity 112, the detokenization service 108 can be configured to match an entity identifier 130 to the token 118 prior to validating the identity 111 of the entity 112. In some examples, a detokenization process can be performed by the detokenization service 108 to match the token 118 of the validation request 116 to an account of the entity 112. For example, the token 118 may be linked to an account number or a card number (e.g., a debit card number or a credit card number) associated with the entity 112 as the entity identifier 130. In some examples, once the token 118 is matched to the entity identifier 130, a mapping that indicates this relationship between the token 118 and the entity identifier 130 can be stored for additional iterations of the process 300 associated with the entity 112.

At block 306, in response to validating the identity 111 of the entity 112, the processing device 202 receives an interaction request 114 created by the request initiator 106 in response to the entity 112 selecting a particular request option 140 of one or more request options 136 generated by the request initiator 106. In some examples, the particular request option 140 may be selected by the entity 112 using a touchscreen or other suitable input device of the computing system 104. In implementations of banking services, the request options 136 may include initiating a withdrawal request, initiating a deposit request, or checking a repository of an account associated with the entity 112. Once the particular request option 140 is selected by the entity 112, additional options may be provided by the processing device 202, for example to select a particular account or amount corresponding to the particular request option 140.

At block 308, the processing device 202 replaces the token 118 of the interaction request 114 with the entity identifier 130 prior to processing the interaction request 114. With the token 118 being replaced by the entity identifier 130, the interaction request 114 can be linked to the entity 112 using the entity identifier 130, enabling the interaction request 114 to be processed. In an example, the interaction request 114 can be processed by a depository institution (e.g., a bank) that can verify an amount of resources associated with the entity 112 using the entity identifier 130 prior to allowing or denying the interaction request 114.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processing device; and
   a memory device including instructions that are executable by the processing device for causing the processing device to perform operations comprising:
      receiving, by a detokenization service, an inquiry request generated by a software application in response to receiving a validation request to validate an identity of an entity initiating the validation request, the inquiry request including a token used to identify the entity associated with the validation request;
      matching, by the detokenization service based on the inquiry request, an entity identifier to the token to validate the identity of the entity;

subsequent to validating the identity of the entity, generating, by the detokenization service, a validation indication to transmit to the software application, the validation indication including the entity identifier associated with the token and the entity; and
      transmitting, by the detokenization service, the validation indication to the software application, the software application configured to receive an interaction request including the token and replace the token of the interaction request with the entity identifier provided in the validation indication.

2. The system of claim 1, wherein a request initiator is configured to generate the validation request using input transmitted by an entity device of the entity to a contactless receiver of the request initiator.

3. The system of claim 1, wherein a request initiator communicatively coupled to the software application is configured to transmit the interaction request to the software application in response to the entity selecting a particular request option of one or more request options provided via a user interface of the request initiator.

4. The system of claim 1, wherein the operations further comprise:
   receiving, by the detokenization service, an authorization response generated by the software application; and
   in response to receiving the authorization response, completing, by the detokenization service, the validation request, wherein the completed validation request is configured to enable the entity to initiate the interaction request using a request initiator.

5. The system of claim 1, wherein, in response to the detokenization service validating the identity of the entity, the software application is configured to transmit a validation response to a request initiator to cause the request initiator to output a user interface including one or more request options selectable by the entity to initiate the interaction request.

6. The system of claim 1, wherein the validation request is a first validation request initiated by a first entity to validate a first identity of the first entity, and wherein the operations further comprise:
   receiving, by the detokenization service, a second validation request forwarded by the software application to validate a second identity of a second entity initiating the second validation request;
   determining, by the detokenization service, that the second identity of the second entity is unverified; and
   transmitting, by the detokenization service, an invalid response to the software application to indicate that the second identity of the second entity is unverified.

7. The system of claim 1, wherein the validation request is configured to include the token and a personal identifier usable by the detokenization service to validate the identity of the entity, and wherein the personal identifier is inputted by the entity via a request initiator as authentication information.

8. A computer-implemented method comprising:
   receiving, by a detokenization service, an inquiry request generated by a software application in response to receiving a validation request to validate an identity of an entity initiating the validation request, the inquiry request including a token used to identify the entity associated with the validation request;
   matching, by the detokenization service based on the inquiry request, an entity identifier to the token to validate the identity of the entity;

subsequent to validating the identity of the entity, generating, by the detokenization service, a validation indication to transmit to the software application, the validation indication including the entity identifier associated with the token and the entity; and transmitting, by the detokenization service, the validation indication to the software application, the software application receiving an interaction request including the token and replacing the token of the interaction request with the entity identifier provided in the validation indication.

9. The computer-implemented method of claim 8, wherein a request initiator generates the validation request using input transmitted by an entity device of the entity to a contactless receiver of the request initiator.

10. The computer-implemented method of claim 8, wherein a request initiator communicatively coupled to the software application transmits the interaction request to the software application in response to the entity selecting a particular request option of one or more request options provided via a user interface of the request initiator.

11. The computer-implemented method of claim 8, further comprising:

receiving, by the detokenization service, an authorization response generated by the software application; and in response to receiving the authorization response, completing, by the detokenization service, the validation request, wherein the completed validation request enables the entity to initiate the interaction request using a request initiator.

12. The computer-implemented method of claim 8, wherein, in response to the detokenization service validating the identity of the entity, the software application transmits a validation response to a request initiator to cause the request initiator to output a user interface including one or more request options selectable by the entity to initiate the interaction request.

13. The computer-implemented method of claim 8, wherein the validation request is a first validation request initiated by a first entity to validate a first identity of the first entity, and wherein the method further comprises:

receiving, by the detokenization service, a second validation request forwarded by the software application to validate a second identity of a second entity initiating the second validation request;

determining, by the detokenization service, that the second identity of the second entity is unverified; and transmitting, by the detokenization service, an invalid response to the software application to indicate that the second identity of the second entity is unverified.

14. The computer-implemented method of claim 8, wherein the validation request includes the token and a personal identifier usable by the detokenization service to validate the identity of the entity, and wherein the personal identifier is inputted by the entity via a request initiator as authentication information.

15. A non-transitory computer-readable medium comprising program code executable by a processing device for causing the processing device to perform operations comprising:

receiving, by a detokenization service, an inquiry request generated by a software application in response to receiving a validation request to validate an identity of an entity initiating the validation request, the inquiry request including a token used to identify the entity associated with the validation request;

matching, by the detokenization service based on the inquiry request, an entity identifier to the token to validate the identity of the entity;

subsequent to validating the identity of the entity, generating, by the detokenization service, a validation indication to transmit to the software application, the validation indication including the entity identifier associated with the token and the entity; and transmitting, by the detokenization service, the validation indication to the software application, the software application receiving an interaction request including the token and replacing the token of the interaction request with the entity identifier provided in the validation indication.

16. The non-transitory computer-readable medium of claim 15, wherein a request initiator generates the validation request using input transmitted by an entity device of the entity to a contactless receiver of the request initiator.

17. The non-transitory computer-readable medium of claim 15, wherein a request initiator communicatively coupled to the software application transmits the interaction request to the software application in response to the entity selecting a particular request option of one or more request options provided via a user interface of the request initiator.

18. The non-transitory computer-readable medium of claim 15, wherein the operations further comprise:

receiving, by the detokenization service, an authorization response generated by the software application; and in response to receiving the authorization response, completing, by the detokenization service, the validation request, wherein the completed validation request enables the entity to initiate the interaction request using a request initiator.

19. The non-transitory computer-readable medium of claim 15, wherein, in response to the detokenization service validating the identity of the entity, the software application transmits a validation response to a request initiator to cause the request initiator to output a user interface including one or more request options selectable by the entity to initiate the interaction request.

20. The non-transitory computer-readable medium of claim 15, wherein the validation request is a first validation request initiated by a first entity to validate a first identity of the first entity, and wherein the operations further comprise:

receiving, by the detokenization service, a second validation request forwarded by the software application to validate a second identity of a second entity initiating the second validation request;

determining, by the detokenization service, that the second identity of the second entity is unverified; and transmitting, by the detokenization service, an invalid response to the software application to indicate that the second identity of the second entity is unverified.

* * * * *